United States Patent [19]
Wienand

[11] 3,758,655
[45] Sept. 11, 1973

[54] PROCESS FOR THE MANUFACTURE OF ROUGH BLOCKS
[75] Inventor: Michael Wienand, Sieburg, Germany
[73] Assignee: Dynamit Nobel AG, Troisdorf, Germany
[22] Filed: Apr. 29, 1970
[21] Appl. No.: 32,803

[52] U.S. Cl............... 264/105, 264/115, 264/118, 264/126
[51] Int. Cl.................. C04b 43/00, B29c 24/00
[58] Field of Search............... 264/119, 115, 118, 264/126, 157, 158, 159, 104

[56] References Cited
UNITED STATES PATENTS
| | | | |
|---|---|---|---|
| 3,466,223 | 9/1969 | Beeler et al. | 264/126 |
| 1,975,515 | 10/1934 | Mayer | 264/115 |
| 3,192,294 | 6/1965 | Streed et al. | 264/126 |
| 3,492,388 | 1/1970 | Inglin-Knusel | 264/118 |
| 3,286,007 | 11/1966 | Wilkie et al. | 264/119 |
| 3,523,148 | 8/1970 | Boyer et al. | 264/109 |

Primary Examiner—Robert F. White
Assistant Examiner—J. R. Hall
Attorney—Craig, Antonelli and Hill

[57] ABSTRACT

A process for the production of sheeting from chips of a thermoplastic material includes the steps of forming a granulated thermoplastic synthetic polymeric material transversely and longitudinally into a crude sheet, cutting the crude sheet into transverse strips, and cutting the transverse strips longitudinally into chips having approximately rectangular configurations. Thereafter the process further includes stacking the chips in a uniform distribution in a thin layer, heating the stacked chips to sinter the layer of stacked chips into a sheet, winding the sheet into a round multilayered block, radially compressing the multilayered block, cooling the compressed block and peripherally paring the compressed block into sheeting.

25 Claims, 5 Drawing Figures

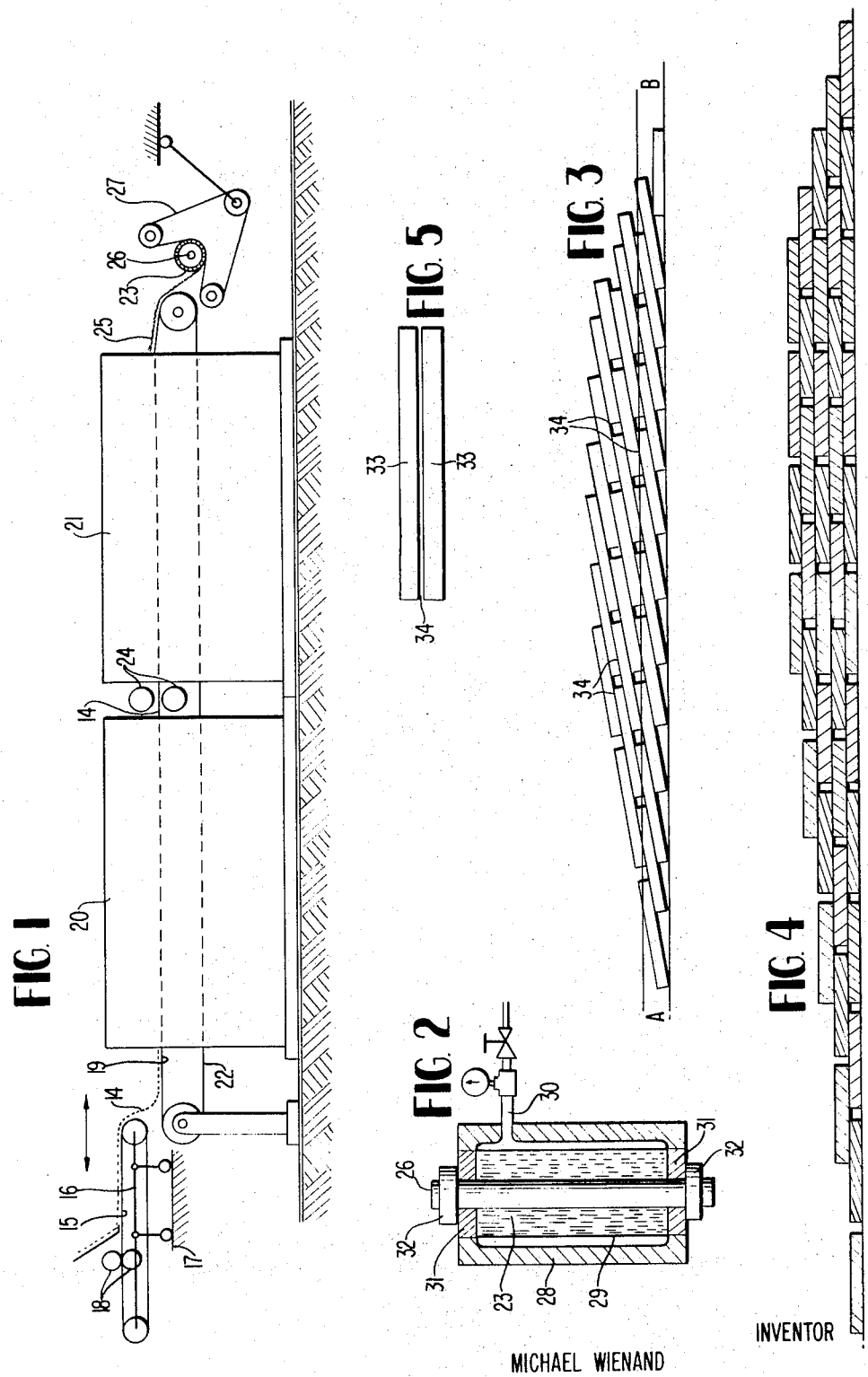

PROCESS FOR THE MANUFACTURE OF ROUGH BLOCKS

BACKGROUND OF THE INVENTION

The present invention relates to a process for the mechanical manufacture of rough blocks from chips of a thermoplastic material for further processing in the production of plates and the like. According to the present invention at least one crude sheet having approximately the width of the plate or the like to be manufactured is calendered from a granulated material, and this crude sheet is first cut into transverse strips and then subdivided into chips of an approximately rectangular configurations, whereupon said chips are stacked in a uniform distribution, heated, and pressed into a block, said block after cooling, being divided into plates or the like.

In accordance with the process disclosed in copending application Ser. No. 22,579 filed Mar. 25, 1970 having the same assignee as the present application, the chips are stacked in a uniform distribution up to the height of the desired rough block, heated, and the stack is subdivided in accordance with the depth dimension of the rough block and deposited into a box mold. Such a box-shaped block makes it merely possible to produce plates by a paring operation ( a paring-off of sheeting is impossible). However, the manufacture of sheeting is very desirable, for example, for floor coverings, because it can be economically installed. Thus, it is the objective of the present invention, in a further development of the process of the present application, to provide the possibility for the production of round blocks which permits the paring of sheeting therefrom.

SUMMARY OF THE INVENTION

An object of the present invention is to avoid the prior art disadvantages in the plates provided by the process for the manufacture of rough blocks.

Another object of the present invention is to provide a process for manufacturing round blocks from which sheeting can be produced.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages maY be eliminated and a much improved process for manufacturing round blocks may be obtained by stacking the chips in smaller layer thicknesses and sintering them into a sheet under the effect of staggered heating. This sheet is then wound up into a round block, radially compressed, cooled upon reaching a predetermined pressure value, and after continuous welding, is pared peripherally into sheeting.

The most important advantage of such a process, as mentioned above, resides in the fact that sheeting can be manufactured instead of plates. The sheeting stock can be rapidly installed and furthermore, in the rolled-up condition, entails less packaging and conveying problems than plates. Another advantage resides in the fact that the sheets exhibit none or only minor inner stresses which could result in warping of the installed covering and in the lifting-off of said covering from the floor. Any type of pattern can be produced in accordance with the process of the present invention. Because of the radial compression of the round block, no shifts in the pattern occur. Thus the same marbling is always obtained. Furthermore, about ⅓ to ¼ less circulating (rotating) material is produced than previously, whereby a considerably saving in the material is obtained. The additional manufacture of conductive coatings which can be spread on the sheeting in the form of a paste is also a feature of the present invention. The conductive coatings can be applied as hereinafter described and in the same manner as in the above copending application.

In order to ensure that the stacked chips, under the influence of heat, will sinter together into a crude sheet, it is desired that the stack of chips to be sintered into a sheet be provided in a layer thickness of about 2 – 30 mm., preferably between about 4 and 20 mm. During the heat treatment, preferably prior to entering the zones of elevated temperature, the sheet can be subjected to a preliminary compression step resulting in accelerated sintering.

Since pressing in the axial direction is impossible in patterned blocks, because the flow then occurs in the axial direction and non-uniform marbling is produced over the width of the sheet, the end faces of the round block, to smooth the same, are compressed only to such an extent as approximately corresponds to the width of the crude sheet. Therefore, in this manner, a uniform width of the sheet pared from the round block is ensured, without there being a change in the pattern (design). The compression proper of the rolled-up sheeting into a compact round block is conducted hydraulically or pneumatically from the outside and/or from the interior of the block, in the radial direction. Upon reaching a predetermined pressure value, the round block is cooled from the inside and/or from the outside. It has proved to be advantageous to compress the formed round block radially from the outside and to cool the same from the inside as soon as the predetermined pressure is attained, and to maintain this amount of pressure until a flawless welding (fusion) is obtained. The internal cooling of the round block can be effected by cooling a rolled-up core of steel or the like disposed in the round block. This provides the advantage that the round block shrinks on the core, so that no anchoring of the core is necessary for paring the block. Of course, it is also possible to additionally cool the pressure medium, which, however, is not very advantageous because there is the danger that cracks are formed in the block, since the material cannot continue its flow from the solidified outer zone. Likewise, a compression of the block from the inside toward the outside in the radial direction is unsuitable for the reasons mentioned above. Besides, in this case, the core necessary for the paring process must be introduced subsequently and must be fixedly mounted for paring the block.

The apparatus for conducting the process of the present invention is characterized in that a windup device for the sintered sheet is disposed behind the reciprocating conveyor belt. This windup device exhibits a rotatable, preferably hollow core, which can be inserted, with the round block wound up thereon, into a substantially cylindrical radial press mold. End plates serving for the axial compression of the round block can be pushed onto the core and affixed thereto. The core, the round block, and the end plates are inserted into the press mold. In this mold, a radial pressure is exerted on the round block by means of a tubular diaphragm which is expandable hydraulically or pneumatically from the inner wall of the mold and/or from the core. In order to cool the round block, the hollow core and/or the tubular diaphragm can be provided with a cooling medium flowing therethrough.

Suitably, at least two heating tunnels are provided, wherein the second tunnel exhibits a higher temperature that the first. In order to pass the stacked chips through the heating tunnels, several conveying belts can be disposed in a side-by-side relationship and can be employed for the feeding operation, alternately. In this connection, it is advantageous for each conveyor belt to move more rapidly during passage through the last heating tunnel than in the preceding stages.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 shows a lateral view of a production line for rough blocks from chips of a thermoplastic material for further processing for the production of sheeting;

FIG. 2 is a longitudinal sectional view of a cylindrical radial press mold for the round blocks;

FIGS. 3 and 4 show various ways of stacking the chips; and

FIG. 5 represents two sheets with an electrically conductive layer therebetween.

DESCRIPTION OF THE PREFERRED EMBODIMENTS

Referring now to the drawings are the chips 14, manufactured from sheets of a thermoplastic material in the elements 1 – 10 of FIG. 1 of the aforementioned application Ser. No. 22,579. In short, the process of forming chips 14 advantageously consists of calendering a granulated thermoplastic material into at least one crude sheet, cutting the crude sheet into transverse strips and cutting the transverse strips longitudinally into chips having approximately rectangular configurations. As shown these chips are introduced onto the conveyor belt 15 which is driven by a pair of rolls 18 at a constant speed. The conveyor belt is fashioned as a direction-changing device 16, by providing a reciprocating underframe 17. If the advancement speed of the direction-changing device 16 is the same as that of the conveyor belt 15, then the latter is at a stand-still relatively to the direction-changing device and does not deposit any chips 14 on the subsequent conveyor belt 19 which traverses through heating tunnels 20, 21. Only upon the return motion of the direction-changing device 16, are the chips dropped onto the conveyor belt 19. By synchronizing the individual speeds, various types of stacking of the chips 14 can be obtained. Two possibilities are represented in a purely theoretical manner in FIGS. 3 and 4. A layer arrangement according to FIG. 3 is obtained when the return speed is low, so that the chips, during their deposition, are stacked one above the other in the manner of roof tiles, whereas, when the return motion takes place rapidly, a stacking pattern according to FIG. 4 is obtained.

A chain 22 pulls the conveyor belt 19 at a uniform speed into the heating tunnel 20 until the required amount of weight for a round block 23 is attained. Then, the belt 19 is pulled, by means of a quick-motion mechanism, into a second heating tunnel 21 which is at an elevated temperature, and during this step the stack of chips 14 disposed on the belt is optionally subjected to a preliminary compression by means of a pair of rolls 24 located between tunnel 20 and tunnel 21. In this heating tunnel 21, the chips 14 sinter at a higher temperature, preferably at about 170°-180° C., into a sheet 25 which, after the sheet material has reached the required temperature, is wound around a windup core 26 into the round block 23. A contact pressure mechanism 27 serves for obtaining a uniform windup of the sheet 25.

In order to accelerate the procedure, several conveyor belts 19 can be provided side-by-side, which belts are coupled with appropriate drive means. In this connection, the procedure is such that, during the windup of the round block 23, a second belt is charged with chips in the heating tunnel 20, and a third belt is ready for entering and charging when the second belt is introduced, by means of the quick-motion mechanism, into the heating tunnel 21. In the meantime, the windup operation has been terminated and the belt returns to its ready-for-operation position.

In order to press-mold the round block 23 radially, a substantially cylindrical press mold 28 is employed (FIG. 2). In the illustrated example, the round block 23 is to be compressed from the outside. For this purpose, a tubular diaphragm 29 is provided on the inner wall of the press mold 28. By way of a conduit 30, provided with a control valve, pressurized air or a pressure fluid can be charged to this diaphragm. Prior to insertion of the round block 23 into the mold 28, end plates 31 are pushed onto the windup core 26 and secured to the core by means of locks 32 under minor axial compression of the round block 23. Depending upon the extent to which the tubular diaphragm 29 is widened, the round block 23, after reaching the required amount of pressure, is compressed more or less densely and is subsequently cooled by windup core 26. This is achieved by making the core hollow and by flowing a cooling medium through the cavity of the core. In case it is necessary to subject the round block to external cooling, the pressure medium of the diaphragm 29 can be cooled. If the radial compressing of the annular block is to emanate additionally or solely from the interior, then a tubular diaphragm can be arranged in a ring around the core 26.

For the production of an electrically conductive floor covering, a layer 34 of an electrically conductive material in the form of conductive paste or a conductive powder (FIG. 5) can be introduced between two sheets 33 (FIG. 5), used to form the chips 14 and the sheets can thereafter be laminated or gelled. It is also possible to provide only one side of the sheets with the paste. However, in that case, there is the danger that the chips produced from the sheets, when transferred to the belt 19, become tilted, and the paste side of one chip is superimposed on the paste side of another chip. This would result in non-uniform electrical values. In order to provide a satisfactory solution in this connection, the chips are inclined in accordance with FIG. 3, so that, when the block 23 is peripherally pared in parallel with respect to reference lines A-B, conductive lines of conductive material layer 34 always extend from the topside of the coating to the underside. The spacing of the conductive lines in the coating can be determined by the size and position of the chips. Furthermore, the spacing of the conductive lines can be influenced by the manner in which the chips are stacked prior to formation of the sheeting. These conductive lines on the sheeting are later on connected with one another either by means of a conductive adhesive applied to the backside of the sheeting or by coating the backside of the sheet with a conductive paste, in order to be able to ground the electrostatic charges accumulating in the sheeting used as a floor covering.

Exemplary of the thermoplastic materials which can be treated by the process of the present invention include polyolefins, e.g. polyethylene and polypropylene, polystyrene, polyvinyl compounds, e.g., polyvinylchloride, polyvinylidene chloride, polytetrafluoroethylene, polymethyl methacrylate, nylon and the like.

The electrically conductive material which can be used in the present invention can comprise, for example, carbon black having an average particle size of about 23 m$\mu$. This carbon black does not contain any additives and can be brushed dry into the surface of the thermoplastic sheets. The carbon black can also be modified with other materials, such as for example, plasticizers, alcohols and various resinous materials to form a paste. Typical conductive paste compositions include, for example, about 10 to 60 percent by weight carbon black, about 4 to 7 percent by weight of a plasticizer and about 83 to 90 percent by weight of an alcohol or about 4 to 17 percent by weight of carbon black, about 58 to 67 percent by weight of a plasticizer and about 25 to 29 percent by weight of polyvinyl chloride. The ground leakage resistance of the paste, depending on the particular composition is between about $1 \times 10^3$ and $1 \times 10^6 \Omega$.

The invention being thus described, it will be obvious that the same may be varied in many ways. Such variations are not to be regarded as a departure from the spirit and scope of the invention, and all such modifications as would be apparent to one skilled in the art are intended to be included.

I claim:
1. A process for the production of sheeting from chips of a thermoplastic synthetic polymeric material which comprises:
  a. stacking said chips uniformly in a thin layer,
  b. heating the thin layer of stacked chips to sinter the chips into a sintered sheet,
  c. winding the sintered sheet into a multi-layered round block,
  d. radially compressing the multi-layered round block to fuse said multi-layers,
  e. cooling the radially compressed fused round block with a cooled core disposed within said compressed block, and
  f. peripherally paring the said compressed block into sheeting.
2. The process of claim 1, wherein said chips have approximately rectangular configurations.
3. The process of claim 2, wherein the thickness of the thin layer of the stacked chips to be sintered is about 2 to 30 mm.
4. The process of claim 2, wherein the thickness of the thin layer of the stacked chips to be sintered is about 4 to 20 mm.
5. The process of claim 1, wherein in step (b) the heating of the thin layer of stacked chips is conducted in two heating stages, the thin layer being subjected to preliminary compression between said two heating stages.
6. The process of claim 5, wherein the heating of the stacked chips in the first stage is conducted at a temperature lower than that of the second stage.
7. The process of claim 6, wherein the second stage is conducted at a temperature of about 170°-180° C.
8. The process of claim 1, wherein after step (c) said multi-layered round block has end faces, before step (d) the end faces of the multi-layered round block are axially compressed to about the width of the crude sheet and then in step (d) the round block is compressed radially.
9. The process of claim 8, wherein the round block is compressed radially by a hydraulic press means.
10. The process of claim 8, wherein the round block is compressed radially by a pneumatic press means.
11. The process of claim 8, wherein the round block is compressed radially from the outside of the round block.
12. The process of claim 8, wherein the round block is cooled internally by said cooled core in step (e).
13. A process for the production of sheeting from granulated thermoplastic synthetic polymeric material which comprises:
  a. calendering a granulated thermoplastic synthetic polymeric material into at least one crude sheet,
  b. cutting said crude sheet into transverse strips,
  c. cutting said transverse strips longiduinally into chips having approximately rectangular configurations,
  d. stacking said chips in a uniform distribution in a thin layer,
  e. heating the thin layer of stacked chips to sinter said stacked chips into a sintered sheet,
  f. winding said sintered sheet into a multi-layered round block,
  g. radially compressing said multi-layered round block to fuse said multi-layers,
  h. cooling the compressed fused block with a cooled core disposed in said compressed block, and
  i. peripherally paring said compressed fused block into sheeting.
14. The process of claim 13, wherein the thickness of the thin layer of the stacked chips to be sintered is about 2 to 30 mm.
15. The process of claim 13, wherein the thicknes of the thin layer of the stacked chips to be sintered is about 4 to 20 mm.
16. The process of claim 13 wherein the heating of the thin layer of the stacked chips is conducted in heating stages, the thin layer being subjected to preliminary compression between said heating stages.
17. The process of claim 13, wherein the heating of the stacked chips in step (e) is conducted in two stages, the heating in the first stage is being conducted at a temperature lower than that of the second stage.
18. The process of claim 17, wherein the second heating stage is conducted at a temperature of about 170°-180° C.

19. The process of claim 13, wherein after step (f) said multi-layered round block has end faces, before step (g) the end faces of the multi-layered round block are axially compressed to about the width of the crude sheet and then in step (g) the round block is compressed radially.

20. The process of claim 13, wherein in step (a) the granulated thermoplastic material is calendered into a plurality of crude sheets and each of the crude sheets are laminated into a single crude sheet before step (b), said single crude sheet being cut into transverse strips in step (b).

21. The process of claim 20, wherein before lamination of said crude sheets an electrically conductive material is inserted between the crude sheets followed by subsequent heating of said crude sheets prior to step (b).

22. The process of claim 21, wherein the electrically conductive material is carbon black.

23. The process of claim 21, wherein the electrically conductive material is carbon black and the carbon black is brushed, dry, into the surface of the crude sheets.

24. The process of claim 21, wherein the electrically conductive material is a paste which comprises about 10 to 60 percent by weight carbon black, about 4 to 7 percent by weight plasticizer and about 83 to 90 percent by weight of an alcohol.

25. The process of claim 21, wherein the electrically conductive material is a paste comprises which about 4 to 17 percent by weight carbon black, about 58 to 67 percent by weight plasticizer and about 25 to 29 percent by weight polyvinyl chloride.

* * * * *